United States Patent
Sun et al.

(10) Patent No.: US 12,537,586 B2
(45) Date of Patent: Jan. 27, 2026

(54) MEASUREMENT METHOD AND TERMINAL DEVICE

(71) Applicant: HUAWEI TECHNOLOGIES CO., LTD., Shenzhen (CN)

(72) Inventors: Xiaoyu Sun, Shenzhen (CN); Haiyi Liu, Shenzhen (CN); Bo Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 446 days.

(21) Appl. No.: 18/005,559

(22) PCT Filed: Jul. 13, 2021

(86) PCT No.: PCT/CN2021/105995
§ 371 (c)(1),
(2) Date: Jan. 13, 2023

(87) PCT Pub. No.: WO2022/012522
PCT Pub. Date: Jan. 20, 2022

(65) Prior Publication Data
US 2023/0275645 A1 Aug. 31, 2023

(30) Foreign Application Priority Data
Jul. 14, 2020 (CN) .................. 202010674604.X

(51) Int. Cl.
*H04W 24/02* (2009.01)
*H04B 7/06* (2006.01)

(52) U.S. Cl.
CPC .......... *H04B 7/0696* (2023.05); *H04W 24/02* (2013.01)

(58) Field of Classification Search
CPC ................ H04B 7/0695; H04B 7/0617; H04B 7/0408; H04W 16/28; H04W 72/046; H04W 24/10; H04W 72/0446; H04W 72/1268; H04W 72/04; H04W 72/23; H04L 1/0001; H04L 2025/03426
See application file for complete search history.

(56) References Cited

U.S. PATENT DOCUMENTS

2019/0191425 A1* 6/2019 Zhu ........................ H04B 7/088
2019/0320364 A1* 10/2019 Jeon ....................... H04B 7/088
2019/0342766 A1* 11/2019 Yanagisawa ........ H04W 72/046

OTHER PUBLICATIONS

CATT, "Design of Beam Training," 3GPP TSG RAN WG1 Meeting #86bis, Lisbon, Portugal, R1-1608774, total 6 pages, 3rd Generation Partnership Project, Valbonne, France (Oct. 10-14, 2016).

* cited by examiner

*Primary Examiner* — Khalid W Shaheed
(74) *Attorney, Agent, or Firm* — Leydig, Voit & Mayer, Ltd.

(57) ABSTRACT

A measurement method and a terminal device are provided. The method includes: the terminal device clusters at least two transmission (TX) beams based on TX beam historical information of the at least two TX beams, to obtain several TX beam categories; and the terminal device determines a target TX-RX beam pair based on the several TX beam categories and at least one receiving RX beam.

15 Claims, 9 Drawing Sheets

300

A terminal device clusters at least two transmission TX beams based on TX beam historical information of the at least two TX beams, to obtain several TX beam categories — S310

The terminal device determines a target TX-RX beam pair based on the several TX beam categories and at least one receiving RX beam — S320

MEASUREMENT METHOD AND TERMINAL DEVICE

CROSS-REFERENCE TO RELATED APPLICATIONS

This application is a national stage of International Application No. PCT/CN2021/105995, filed on Jul. 13, 2021, which claims priority to Chinese Patent Application No. 202010674604.X, filed on Jul. 14, 2020. Both of the aforementioned applications are hereby incorporated by reference in their entireties.

TECHNICAL FIELD

Embodiments of this application relate to the communications field, and in particular, to a measurement method and a terminal device.

BACKGROUND

With development and evolution of a new radio 5th generation (NR 5G), a quantity of antennas configured on a base station side and a quantity of transmission (TX) beams corresponding to the antennas gradually increase. In particular, in a high frequency band, up to 64 TX beams are configured on the base station side. In addition, a plurality of antennas are configured on a terminal device side, and correspond to a plurality of receiving (RX) beams. In a connected-mode beam management process, to find a strongest TX-RX beam pair for communication, a mobile terminal needs to traverse and measure all transmission-receiving (TX-RX) beam combinations, causing large time overheads and power overheads.

Therefore, in a process of searching for a TX-RX beam pair for communication, how to reduce time overheads and power overheads is a problem that needs to be resolved.

SUMMARY

This application provides a measurement method and a terminal device, to avoid traversing and measuring all TX-RX beam pairs, and implement a speed increase and energy saving of beam measurement.

According to a first aspect, a measurement method is provided. The method is applied to a terminal device, and includes: The terminal device clusters at least two transmission TX beams based on TX beam historical information of the at least two TX beams, to obtain several TX beam categories; and the terminal device determines a target TX-RX beam pair based on the several TX beam categories and at least one receiving RX beam.

According to the measurement method provided in this embodiment of this application, because TX beam measurement results sent by a network device are correlated to an extent, the terminal device may cluster the TX beams. In a measurement process, the target TX-RX beam pair may be determined based on a TX beam clustering result and the RX beam, to narrow a search range of the target TX-RX beam pair, avoid a case in which the terminal device traverses all TX-RX beam pairs to perform measurement, and implement energy saving and a speed increase of measurement.

With reference to the first aspect, in some possible implementations, that the terminal device determines a target TX-RX beam pair based on the several TX beam categories and at least one receiving RX beam includes: The terminal device determines a target TX category-RX beam combination based on the several TX beam categories and the at least one RX beam; and the terminal device determines the target TX-RX beam pair based on the target TX category-RX beam combination.

In the solution provided in this embodiment of this application, the terminal device determines a target TX category-RX beam based on the several TX beam categories and the at least one RX beam, and then determines the target TX-RX beam pair based on the target TX category-RX beam. In other words, in the measurement process, the RX beam may be switched based on the TX beam clustering result. In other words, the RX beam may be switched in any obtained TX beam category, to further narrow the search range of the target TX-RX beam pair, avoid the case in which the terminal device traverses all the TX-RX beam pairs to perform measurement, and implement energy saving and a speed increase of measurement.

With reference to the first aspect, in some possible implementations, that the terminal device clusters the at least two TX beams based on TX beam historical information of the at least two TX beams includes: The terminal device combines the at least two TX beams into one category if the TX beam historical information of the at least two TX beams meets a preset condition.

In the solution provided in this embodiment of this application, if the TX beam historical information of the at least two TX beams meets the preset condition, the terminal device may combine the at least two TX beams into one category, to ensure TX beam clustering reliability.

With reference to the first aspect, in some possible implementations, the preset condition is at least one of the following conditions: an included angle cosine of the TX beam historical information of the at least two TX categories is greater than a first threshold, the TX beam historical information of the at least two TX beams changes with time in a same trend, and a difference between measurement results of the at least two TX beams by the terminal device is less than a second threshold.

With reference to the first aspect, in some possible implementations, the TX beam historical information/RX beam historical information includes at least one piece of the following information: signal-to-noise ratios SNRs of the TX beam/RX beam at different moments, signal to interference plus noise ratios SINRs of the TX beam/RX beam at different moments, reference signal received powers RSRPs of the TX beam/RX beam at different moments, and reference signal received quality RSRQ of the TX beam/RX beam at different moments.

With reference to the first aspect, in some possible implementations, that the terminal device clusters at least two TX beams based on TX beam historical information of the at least two TX beams includes: The terminal device clusters the at least two TX beams based on the TX beam historical information of the at least two TX beams in response to indication information received by the terminal device, where the indication information is used to indicate the terminal device to perform optimized beam measurement.

According to a second aspect, a terminal device is provided. The terminal device includes a processor. The processor is configured to: cluster at least two TX beams based on TX beam historical information of the at least two transmission TX beams, to obtain several TX beam categories; and determine a target TX-RX beam pair based on the several TX beam categories and at least one receiving RX beam.

With reference to the second aspect, in some possible implementations, the processor is further configured to:

determine a target TX category-RX beam combination based on the several TX beam categories and the at least one RX beam; and determine the target TX-RX beam pair based on the target TX category-RX beam combination.

With reference to the second aspect, in some possible implementations, the processor is further configured to combine the at least two TX beams into one category if the TX beam historical information of the at least two TX beams meets a preset condition.

With reference to the second aspect, in some possible implementations, the preset condition is at least one of the following conditions: an included angle cosine of the TX beam historical information of the at least two TX categories is greater than a first threshold, the TX beam historical information of the at least two TX beams changes with time in a same trend, and a difference between measurement results of the at least two TX beams by the terminal device is less than a second threshold.

With reference to the second aspect, in some possible implementations, the TX beam historical information/RX beam historical information includes at least one piece of the following information: signal-to-noise ratios SNRs of the TX beam/RX beam at different moments, signal to interference plus noise ratios SINRs of the TX beam/RX beam at different moments, reference signal received powers RSRPs of the TX beam/RX beam at different moments, and reference signal received quality RSRQ of the TX beam/RX beam at different moments.

With reference to the second aspect, in some possible implementations, the processor is further configured to cluster the at least two TX beams based on the TX beam historical information of the at least two TX beams in response to indication information received by the terminal device, where the indication information is used to indicate the terminal device to perform optimized beam measurement.

For beneficial effects of the second aspect, refer to beneficial effects of the first aspect. Details are not described herein again.

According to a third aspect, this application provides a chip system. The chip system includes a processor, configured to implement a function of a terminal device in the method in the foregoing aspects. In a possible design, the chip system further includes a memory, configured to store program instructions and/or data. The chip system may include a chip, or may include a chip and another discrete device.

According to a fourth aspect, a computer-readable storage medium is provided. The computer-readable storage medium stores a computer program, and when the computer program is run, a method performed by a terminal device in the foregoing aspects is implemented.

According to a fifth aspect, a computer program product is provided. The computer program product includes computer program code, and when the computer program code runs, a method performed by a terminal device in the foregoing aspects is performed.

DESCRIPTION OF EMBODIMENTS

The following describes technical solutions of this application with reference to the accompanying drawings.

The technical solutions in embodiments of this application may be applied to various communications systems such as a long term evolution (LTE) system, an LTE frequency division duplex (FDD) system, an LTE time division duplex (TDD), a 5G mobile communications system, an NR communications system, or a future mobile communications system.

Figure 1:
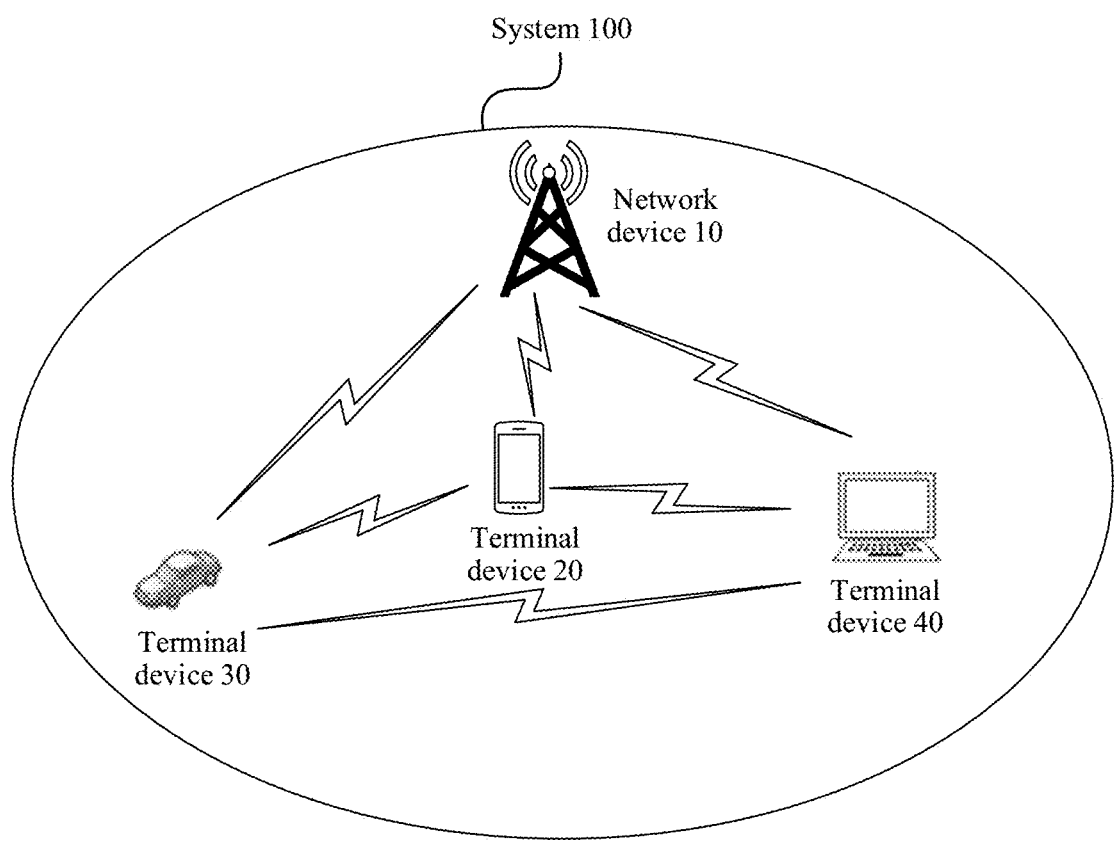
FIG. 1 is a schematic diagram of a wireless communications system applicable to an embodiment of this application.

FIG. 1 is a schematic diagram of a wireless communications system 100 applicable to an embodiment of this application. As shown in FIG. 1, the wireless communications system 100 may include one or more network devices, for example, a network device 10 shown in FIG. 1. The wireless communications system 100 may further include one or more terminal devices such as a terminal device 20, a terminal device 30, and a terminal device 40 shown in FIG. 1.

It should be understood that FIG. 1 is merely a schematic diagram. The communications system may further include another network device, for example, may further include a core network device, a wireless relay device, and a wireless backhaul device, which are not shown in FIG. 1. A quantity of network devices and a quantity of terminal devices included in the mobile communications system is not limited in this embodiment of this application.

In the mobile communications system 100, the terminal device 20, the terminal device 30, and the terminal device 40 in this embodiment of this application may also be referred to as a terminal, a terminal device, a mobile station (MS), a mobile terminal (MT), or the like. The terminal device in this embodiment of this application may be a mobile phone, a tablet computer (Pad), or a mobile computer with a wireless transceiver function, or may be a wireless terminal applied to a scenario such as virtual reality (VR), augmented reality (AR), industrial control, self driving, telemedicine (remote medical), smart grid, transportation safety, smart city, and smart home. In this application, the terminal device and a chip applicable to the terminal device are collectively referred to as a terminal device. It should be understood that a specific technology and a specific device form used for the terminal device are not limited in this embodiment of this application.

The network device 10 in this embodiment of this application may be a device configured to communicate with the terminal device. The network device may be a base station, an evolved nodeB (eNB), a home base station, an access point (AP) in a wireless fidelity (Wi-Fi) system, a wireless relay node, a wireless backhaul node, a transmission point (TP), a transmission and reception point (TRP), or the like, may be a gNB in an NR system, or may be a component or a part of device that constitutes a base station, for example, a central unit (CU), a distributed unit (DU), or a baseband unit (BBU). It should be understood that a specific technology and a specific device form used for the network device are not limited in this embodiment of this application. In this application, the network device may be the network device, or may be a chip applied to the network device to complete a wireless communication processing function.

It should be understood that, in embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

In addition, various storage media described in this specification may indicate one or more devices and/or other machine-readable media that are configured to store information. The term "machine-readable storage media" may include but is not limited to a wireless channel, and various other media that can store, include, and/or carry instructions and/or data.

It should be understood that, division into manners, cases, categories, and embodiments in embodiments of this application is merely for ease of description, and should not constitute a special limitation. Features in various manners, categories, cases, and embodiments may be combined without contradiction.

It should be further understood that "first", "second", and "third" in embodiments of this application are merely for distinguishing, and should not constitute any limitation on this application. For example, "first information" and "second information" in embodiments of this application represent information transmitted between a network device and a terminal device.

It should be further understood that sequence numbers of the processes do not mean execution sequences in embodiments of this application. The execution sequences of the processes need be determined based on functions and internal logic of the processes, and should not constitute any limitation on implementation processes of the embodiments of this application.

It should be further noted that, in embodiments of this application, "preset", "predefinition", and the like may be implemented by pre-storing corresponding code or a table in a device (for example, including the terminal device and the network device) or by using another manner that can be used to indicate related information. A specific implementation thereof in this application, for example, a preset rule or a preset constant in embodiments of this application is not limited.

It should be further noted that, the term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

In the following embodiments, usually, a measurement method in this application is specifically described by using a base station as a network device and by using a communication process of a sidelink between at least two terminal devices and a communication process of an uplink between the terminal device and the base station as an example. The terminal device may be any terminal device that has a wireless connection relationship with one or more network devices in a wireless communications system. It can be understood that any terminal device in the wireless communications system may implement wireless communication based on a same technical solution. This is not limited in this application.

To help understand the solutions of this application, the following first briefly describes an application scenario of this application. However, it should be understood that the following described content is merely used to better understand this application, and should not impose any special limitation on this application.

Figures 2, 3:
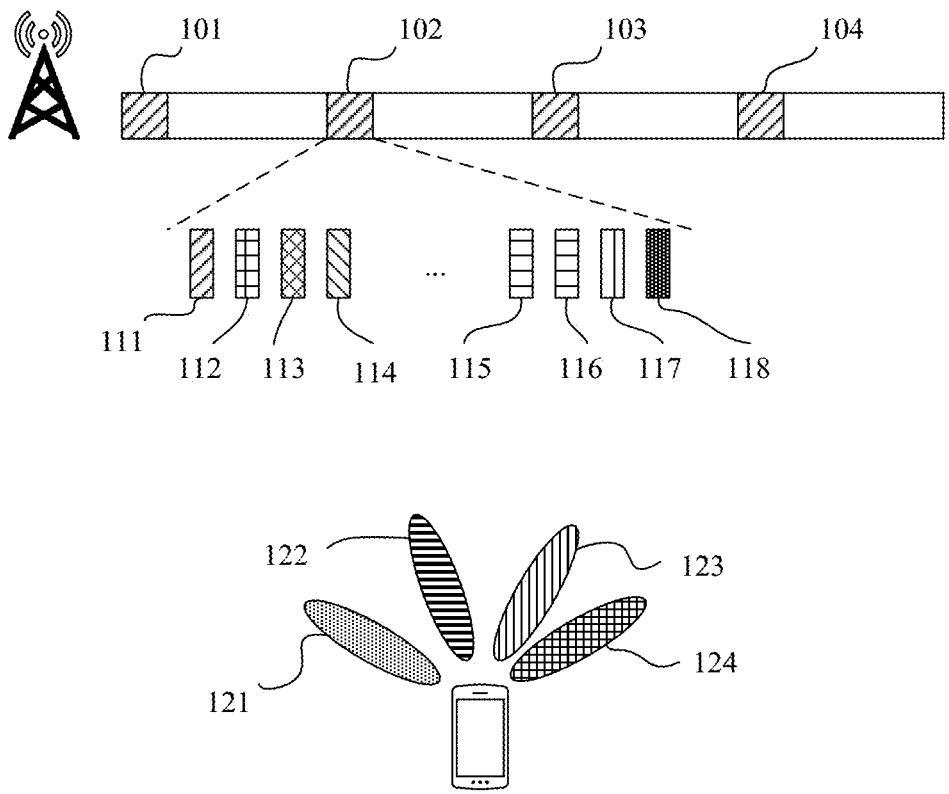
FIG. 2 is a schematic diagram of a scenario of a TX-RX beam according to an embodiment of this application.
FIG. 3 is a schematic flowchart of a measurement method according to an embodiment of this application.

FIG. 2 is a schematic diagram of a scenario of a TX-RX beam according to an embodiment of this application.

Refer to FIG. 2. A base station (which may be understood as a network device in FIG. 1) may periodically send synchronization signal bursts (SS burst) (101 to 104 shown in FIG. 2). Each synchronization signal burst may include several TX beams. A synchronization signal burst 102 is used as an example. The synchronization signal burst 102 may include TX beams 111 to 118. A plurality of antennas may be configured on a terminal device side, and correspond to a plurality of RX beams, for example, RX beams 121 to 124 shown in the figure. A terminal device may measure the TX beams by using different RX beams in a plurality of synchronization signal burst periods, to find a beam that meets a requirement, to communicate with the base station.

With development and evolution of NR 5G, a quantity of antennas configured on a base station side and a quantity of beams corresponding to the quantity of antennas gradually increase. In particular, in a high frequency band, up to 64 beam directions are configured on the base station side. In addition, the plurality of antennas are configured on the terminal device side, and correspond to the plurality of RX beams. In a connected-mode beam management process, to find a strongest TX-RX beam pair to perform communication, a mobile terminal needs to traverse and measure all TX-RX beam combinations, causing large energy and time overheads.

As shown in FIG. 2, in one synchronization signal burst, the base station side delivers synchronization signal blocks (SSB) corresponding to all beams. The terminal device may first fix one RX beam, and traverse and measure all TX beams. The terminal device switches the RX beam once at an end of each synchronization signal burst, until all TX-RX beam combinations are traversed, and the strongest TX-RX beam pair is selected for data transmission. However, in this manner, the terminal device needs to traverse all the TX-RX beam combinations, causing large time overheads and power overheads.

This application provides a measurement method. The terminal device may determine a target TX-RX beam pair based on a TX beam clustering result and an RX beam, and may quickly narrow a search range of the target TX-RX beam pair, to avoid traversing and measuring all TX-RX beam pairs, and implement a speed increase and energy saving of beam measurement.

FIG. 3 is a schematic flowchart of a measurement method 300 according to an embodiment of this application. The measurement method 300 may be performed by any one of the terminal device 20, the terminal device 30, the terminal device 40 in FIG. 1, or the terminal device in FIG. 2. The measurement method 300 may include steps S310 and S320.

S310: The terminal device clusters at least two TX beams based on TX beam historical information of the at least two TX beams, to obtain several TX beam categories.

Optionally, the TX beam historical information in this embodiment of this application may include any one of signal-to-noise ratios (SNR) of the TX beam at different moments, signal to interference plus noise ratios (SINR) of the TX beam at different moments, reference signal received powers (RSRP) of the TX beam at different moments, and reference signal received quality (RSRQ) of the TX beam at different moments.

In this embodiment of this application, RX beam historical information may include any one of SNRs of an RX beam at different moments, SINRs of the RX beam at different moments, RSRPs of the RX beam at different moments, and RSRQ of the RX beam at different moments.

In some embodiments, the TX beam historical information may further include information obtained after at least two parameters in the foregoing information are processed. For example, an average value of the at least two parameters may be obtained, or weighted summation is performed on the at least two parameters. This is not limited.

For example, weighted summation is performed on the at least two parameters. The TX beam historical information may include a value obtained by performing weighted summation on the SNRs of the TX beam at different moments and the SINRs of the TX beam at different moments; or the TX beam historical information may include a value obtained by performing weighted summation on the SNRs of the TX beam at different moments, the SINRs of the TX beam at different moments, and the RSRPs of the TX beam at different moments; or the TX beam historical information may include a value obtained by performing weighted summation on the SNRs of the TX beam at different moments, the SINRs of the TX beam at different moments, the RSRPs of the TX beam at different moments, and the RSRQ of the TX beam at different moments.

Similarly, in some embodiments, the RX beam historical information may further include information obtained after at least two parameters in the foregoing information are processed. For example, an average value of the at least two parameters may be obtained, or weighted summation is performed on the at least two parameters.

For example, weighted summation is performed on the at least two parameters. The RX beam historical information may include a value obtained by performing weighted summation on the SNRs of the RX beam at different moments and the SINRs of the RX beam at different moments; or the RX beam historical information may include a value obtained by performing weighted summation on the SNRs of the RX beam at different moments, the SINRs of the RX beam at different moments, and the RSRPs of the RX beam at different moments; or the RX beam historical information may include a value obtained by performing weighted summation on the SNRs of the RX beam at different moments, the SINRs of the RX beam at different moments, the RSRPs of the RX beam at different moments, and the RSRQ of the RX beam at different moments.

It should be understood that if the TX beam historical information/RX beam historical information includes the value obtained by performing weighted summation on the at least two parameters in the foregoing information, there may further be another case. For brevity, details are not described herein.

It should be noted that the SNR may also be referred to as a signal-to-noise ratio, and is a ratio of a signal to noise in an electronic device; and the SINR may also be referred to as a signal to interference plus noise ratio, and is a ratio of a strength of a wanted signal received by the electronic device to a strength of a received interference signal.

S320: The terminal device determines a target TX-RX beam pair based on the several TX beam categories and at least one receiving RX beam.

In this embodiment of this application, the several TX beam categories may include a same quantity of TX beams or different quantities of TX beams. This is not specifically limited in this application.

For example, it is assumed that a network device sends 16 TX beams. The terminal device clusters the 16 TX beams in step S310, to obtain four TX beam categories, which are respectively a TX beam category 1, a TX beam category 2, a TX beam category 3, and a TX beam category 4. The four beam categories each may include four TX beams. Alternatively, two (for example, the beam category 1 and the beam category 2) of the four beam categories each may include four TX beams, and the other two beam categories (for example, the beam category 3 and the beam category 4) may respectively include two TX beams and six TX beams. Alternatively, three (for example, the beam category 1, the beam category 2, and the beam category 3) of the four beam categories each may include three TX beams, and the other beam category (for example, the beam category 4) may include seven TX beams. This is not limited.

It should be understood that the numbers are merely examples, and may alternatively be another number. No special limitation is imposed on this application.

According to the measurement method provided in this embodiment of this application, because TX beam measurement results sent by the network device are correlated to an extent, the terminal device may cluster the TX beams. In a measurement process, the target TX-RX beam pair may be determined based on a TX beam clustering result and the RX beam, to narrow a search range of the target TX-RX beam pair, avoid a case in which the terminal device traverses all TX-RX beam pairs to perform measurement, and implement energy saving and a speed increase of measurement.

It is noted above that the terminal device may determine the target TX-RX beam pair based on the several TX beam categories and the at least one receiving RX beam. This is described in detail below.

Optionally, that the terminal device determines a target TX-RX beam pair based on the several TX beam categories and at least one receiving RX beam includes: The terminal device determines a target TX category-RX beam combination based on the several TX beam categories and the at least one RX beam; and the terminal device determines the target TX-RX beam pair based on the target TX category-RX beam combination.

In this embodiment of this application, the terminal device may first select the target TX category-RX beam combination based on a plurality of TX beam categories and the at least one RX beam. In other words, the terminal device may first determine a TX beam in each of the plurality of TX beam categories and a corresponding RX beam, to form the target TX category-RX beam combination; and then, may determine a target TX-RX beam pair for communication based on the target TX category-RX beam combination, in other words, select the target TX-RX beam pair from the target TX category-RX beam combination (including a plurality of TX-RX beams).

It can be understood that, in a process in which the terminal device determines the target TX category-RX beam combination based on the several TX beam categories and the at least one RX beam, the terminal device may switch the RX beam for different TX beams in each TX beam category, until all the TX beam categories and RX beam combinations are traversed and the target TX category-RX beam combination is selected.

In other words, in the process in which the terminal device determines the target TX category-RX beam combination based on the several TX beam categories and the at least one RX beam, TX beams included in each TX beam category may correspond to different RX beams, and an optimal TX-RX beam in each TX beam category is determined, to form the target TX category-RX beam combination in this application.

In a process in which the terminal device determines the target TX-RX beam pair for communication based on the target TX category-RX beam combination, the terminal device may fix the RX beam, traverse and measure all TX beams in the TX beam categories, and select a TX-RX beam pair with a strongest signal for communication.

In the solution provided in this embodiment of this application, the terminal device determines the target TX category-RX beam based on the several TX beam categories and the at least one RX beam, and then determines the target TX-RX beam pair based on the target TX category-RX beam. In other words, in the measurement process, the RX beam may be switched based on the TX beam clustering result. In other words, the RX beam may be switched in any obtained TX beam category, to further narrow the search range of the target TX-RX beam pair, avoid the case in which the terminal device traverses all the TX-RX beam pairs to perform measurement, and implement energy saving and a speed increase of measurement.

Optionally, in some embodiments, that the terminal device clusters at least two TX beams based on TX beam historical information of the at least two TX beams includes: The terminal device combines the at least two TX beams into one category if the TX beam historical information of the at least two TX beams meets a preset condition.

In this embodiment of this application, combining the at least two TX beams into one category may be understood as combining the at least two TX beams into one category, or may be understood as combining at least two TX beam categories into one category, or may be understood as combining at least one TX beam and at least one TX beam category into one category. This is not limited.

It should be noted that if the at least two TX beams include a TX beam category, in a combination process, average beam historical information of a TX beam included in the TX beam category may be first calculated. For example, the beam historical information is an RSRP. It is assumed that the TX beam category includes two TX beams, which are respectively a TX beam 1 and a TX beam 2, and RSRPs corresponding to the TX beam 1 and the TX beam 2 at a moment are respectively 65 dBm and 45 dBm. Therefore, average beam historical information of the TX beam category may be (65+45)/2=55 dBm at the moment.

Certainly, in some embodiments, the average beam historical information of the TX beam may alternatively be a geometric average value, a root mean square average value, a weighted average value, or the like of RSRPs of the TX beams included in the TX beam category. This is not specifically limited in this application.

In addition, in some embodiments, the terminal device may first initialize each of the at least two TX beams into one TX beam category, and randomly select two TX beam categories. If the two TX beam categories meet the preset condition, the terminal device may combine the two TX beam categories into one category.

In the solution provided in this embodiment of this application, if the TX beam historical information of the at least two TX beams meets the preset condition, the terminal device may combine the at least two TX beams into one category, to ensure TX beam clustering reliability.

The foregoing describes a case in which the terminal device may cluster the at least two TX beams based on the preset condition. The preset condition may include different conditions. For details, refer to the following.

Optionally, in some embodiments, the preset condition is at least one of the following conditions: an included angle cosine of the TX beam historical information of the at least two TX categories is greater than a first threshold, the TX beam historical information of the at least two TX beams changes with time in a same trend, and an absolute value of a difference between measurement results of the at least two TX beams by the terminal device is less than a second threshold.

The preset condition in this embodiment of this application may include at least one of the foregoing conditions. The foregoing conditions are separately used as an example for description below.

(1) Preset Condition 1

The preset condition 1 may be that the included angle cosine of the TX beam historical information of the at least two TX categories is greater than the first threshold.

In this embodiment of this application, it is assumed that the network device sends four TX beams, which are respectively a TX beam 1, a TX beam 2, a TX beam 3, and a TX beam 4. The terminal device may first determine whether the TX beam 1 and the TX beam 2 meet the preset condition 1.

If the TX beam 1 and the TX beam 2 meet the preset condition 1, whether the TX beam 3 and a TX beam category including the TX beam 1 and the TX beam 2 meet the preset condition. If the TX beam 1 and the TX beam 2 do not meet the preset condition 1, whether the TX beam 3 and the TX beam 1 meet the preset condition 1 and whether the TX beam 3 and the TX beam 2 meet the preset condition 1 may be separately determined. For the TX beam 4, determining may be performed based on a method similar to the foregoing method.

Figure 4:
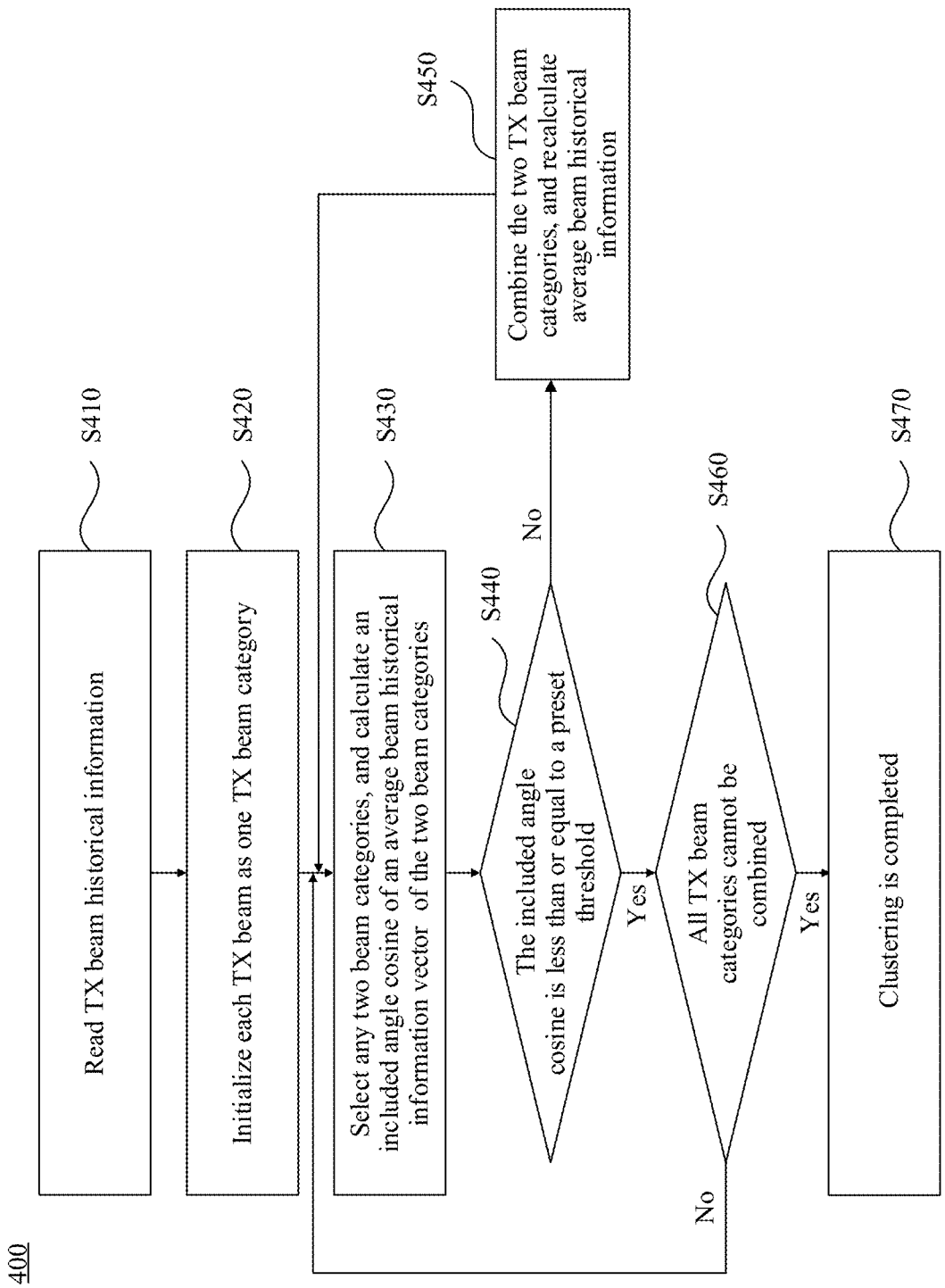
FIG. 4 is a schematic flowchart of a TX beam clustering method according to an embodiment of this application.

FIG. 4 is a schematic flowchart of a TX beam clustering method 400 according to an embodiment of this application. The method 400 may include steps S410 to 470. The following provides detailed descriptions with reference to FIG. 4.

S410: Read the TX beam historical information.

As described above, the TX beam historical information may include a value obtained by processing any one or at least any two of the SNRs of the TX beam at different moments, the SINRs of the TX beam at different moments, the RSRPs of the TX beam at different moments, and RSRQ of the TX beam at different moments.

S420: Initialize each TX beam into the TX beam as one TX beam category.

As described above, it is assumed that the network device sends four TX beams, which are respectively a TX beam 1, a TX beam 2, a TX beam 3, and a TX beam 4. The terminal device may initialize the four TX beams into four TX beam categories, which are respectively a TX beam category 1, a TX beam category 2, a TX beam category 3, and a TX beam category 4.

It should be understood that, in some embodiments, this step is an optional step. To be specific, the terminal device may not initialize each TX beam into one TX beam category, but directly perform step S430.

S430: Select any two beam categories, and calculate an included angle cosine of an average beam historical information vector of the two beam categories.

If the included angle cosine is less than or equal to a first preset threshold, step S440 may be performed, and if the included angle cosine is greater than the first preset threshold, step S450 may be performed.

For example, the TX beam historical information is an RSRP. For an $i^{th}$ beam, historical beam information of the $i^{th}$ beam may be expressed as follows:

$$\vec{b}_i = (b_{i,1}, b_{i,2}, \ldots, b_{i,T}) \quad (1)$$

Herein, $b_{i,t}$ represents an RSRP obtained by measuring the $i^{th}$ beam for a $t^{th}$ time.

Specifically, beam historical information of the TX beam category 1 may be expressed as $\vec{b}_1 = (b_{1,1}, b_{1,2}, \ldots, b_{1,T})$, beam historical information of the TX beam category 2 may be expressed as $\vec{b}_2 = (b_{2,1}, b_{2,2}, \ldots, b_{2,T})$, beam historical information of the TX beam category 3 may be expressed as $\vec{b}_3 = (b_{3,1}, b_{3,2}, \ldots, b_{3,T})$, and beam historical information of the TX beam category 4 may be expressed as $\vec{b}_4 = (b_{4,1}, b_{4,2}, \ldots, b_{4,T})$.

For any two beam categories $g_m$ and $g_n$, an included angle cosine of average beam historical information of the beam categories $g_m$ and $g_n$ may be expressed as follows:

$$\cos(\vec{Pg}_m, \vec{Pg}_n) = \frac{\vec{Pg}_m \cdot \vec{Pg}_n}{|\vec{Pg}_m| \cdot |\vec{Pg}_n|}$$

(2)

It is assumed that the TX beam category 1 and the TX beam category 2 are selected, and T=5. Therefore, an included angle cosine of beam historical information of the two beam categories is calculated based on Formula (2):

$$\cos(\vec{Pb}_1, \vec{Pb}_2) = \frac{\vec{Pb}_1 \cdot \vec{Pb}_2}{|\vec{Pb}_1| \cdot |\vec{Pb}_2|}$$

If the beam historical information of the TX beam type 1 and the TX beam type 2 is respectively:

$$\vec{b}_1 = (b_{1,1}, b_{1,2}, \ldots, b_{1,T}) = (65, 43, 52, 82, 60); \text{ and}$$

$$\vec{b}_2 = (b_{2,1}, b_{2,2}, \ldots, b_{2,T}) = (40, 50, 68, 58, 76).$$

Therefore, the included angle cosine of the TX beam category 1 and the TX beam category 2 is:

$$\cos(\vec{Pb}_1, \vec{Pb}_2) = \frac{\vec{Pb}_1 \cdot \vec{Pb}_2}{|\vec{Pb}_1| \cdot |\vec{Pb}_2|} = \frac{65 \cdot 40 + 43 \cdot 50 + 52 \cdot 68 + 82 \cdot 58 + 60 \cdot 76}{\sqrt{65^2 + 43^2 + 52^2 + 82^2 + 60^2} \cdot \sqrt{40^2 + 50^2 + 68^2 + 58^2 + 76^2}} = 0.95$$

If the first preset threshold in this embodiment of this application is 0.5, because the included angle cosine of the TX beam category 1 and the TX beam category 2 is greater than 0.5, step S450 may be performed, to combine the TX beam category 1 and the TX beam category 2 into one category. The category may be referred to as a TX beam category 1-2.

Two TX beam categories continue to be selected. It is assumed that the TX beam category 1-2 and the TX beam category 3 are selected. An included angle cosine of beam historical information of the two beam categories is calculated based on Formula (2).

It should be noted that, because the TX beam category 1-2 includes two TX beams, average beam historical information of the two TX beams included in the TX beam category 1-2 may be first calculated, as shown in Formula (3).

$$\vec{Pg} = \frac{1}{N} \sum_{i=0}^{N} b_i \quad (3)$$

In this case, the average beam historical information of the TX beam category 1-2 may be $$\vec{Pb}_{1-2} = \frac{1}{N} \sum_{i=0}^{N} b_i = (52.5, 41.5, 60, 70, 68).$$

If the beam historical information of the TX beam category 3 is $\vec{b}_3 = (b_{3,1}, b_{3,2}, \ldots, b_{3,T}) = (10, 15, 0, 1, 12)$, an included angle cosine of the TX beam category 1-2 and the TX beam category 3 may be calculated based on Formula (2).

$$\cos(\vec{Pb}_{1-2}, \vec{Pb}_3) = \frac{\vec{Pb}_{1-2} \cdot \vec{Pb}_3}{|\vec{Pb}_{1-2}| \cdot |\vec{Pb}_3|} = \frac{52.5 \cdot 10 + 41.5 \cdot 5 + 60 \cdot 0 + 70 \cdot 1 + 68 \cdot 12}{\sqrt{52.5^2 + 41.5^2 + 60^2 + 70^2 + 68^2} \cdot \sqrt{10^2 + 5^2 + 0^2 + 1^2 + 12^2}} = 0.17$$

Because the included angle cosine of the TX beam category 1-2 and the TX beam category 3 is less than the first preset threshold 0.5, step S440 may be performed, and step S460 may be performed until all the TX beam categories cannot be combined. If a TX beam category can still be combined, step S430 may be performed.

S470: Clustering is completed.

It should be noted that the numbers are merely examples. In some embodiments, the numbers may alternatively be another number. No special limitation is imposed on this application.

(2) Preset Condition 2

The preset condition 2 may be that the TX beam historical information of the at least two TX beams changes with time in a same trend.

Similarly, it is assumed that the network device sends four TX beams, which are respectively a TX beam 1, a TX beam 2, a TX beam 3, and a TX beam 4. The terminal device may determine whether TX beam historical information of the four TX beams changes with time in a same trend.

The terminal device may initialize the four TX beams into four TX beam categories, which are respectively a TX beam category 1, a TX beam category 2, a TX beam category 3, and a TX beam category 4. Whether TX beam historical information of the TX beam category 1 and the TX beam category 2 changes with time in a same trend may be first determined.

Similarly, the step of initializing the four TX beams into four TX beam categories is an optional step. In some embodiments, the terminal device may not perform this step, and may directly determine whether TX beam historical information of any two TX beams changes with time in a same trend.

For example, the beam historical information is an RSRP. If an RSRP of the TX beam category 1 and an RSRP of the TX beam category 2 change with time in a same trend, the terminal device may combine the TX beam category 1 and the TX beam category 2 into one category, where the category may be referred to as a TX beam category 1-2, and then, may determine whether an RSRP of the TX beam category 1-2 and an RSRP of the TX beam category 3 change with time in a same trend.

If the RSRP of the TX beam category 1 and the RSRP of the TX beam category 2 change with time in different trends, the terminal device may determine whether the RSRP of the TX beam category 1 and the RSRP of the TX beam category 3 change with time in a same trend; or may determine whether the RSRP of the TX beam category 1 and an RSRP of the TX beam category 4 change with time in a same trend; or may determine whether the RSRP of the TX beam category 2 and the RSRP of the TX beam category 3 change with time in a same trend; or may determine whether the RSRP of the TX beam category 2 and an RSRP of the TX beam category 4 change with time in a same trend. This is not limited.

In other words, when the terminal device determines that RSRPs of any two TX beam categories change with time in a same trend, the two TX beam categories may be referred to as a group of TX beam categories, and the terminal device may continue to determine whether an RSRP of another TX beam category and an RSRP of the group of TX beam categories change with time in a same trend. When the terminal device determines that RSRPs of any two TX beam categories change with time in different trends, the terminal device may determine whether an RSRP of another TX beam category and an RSRP of one of the two TX beam categories change with time in a same trend.

In conclusion, the terminal device may combine a plurality of TX beam categories by determining whether RSRPs of any two TX beam categories change with time in a same trend, to obtain several TX beam categories in this embodiment of this application.

(3) Preset Condition 3

The preset condition 3 may be that the absolute value of the difference between the measurement results of the at least two TX beams by the terminal device is less than the second threshold.

Similarly, it is assumed that the network device sends four TX beams, which are respectively a TX beam 1, a TX beam 2, a TX beam 3, and a TX beam 4. The terminal device may determine whether an absolute value of a difference between measurement results of the four TX beams is less than the second threshold.

The terminal device may initialize the four TX beams into four TX beam categories, which are respectively a TX beam category 1, a TX beam category 2, a TX beam category 3, and a TX beam category 4. The terminal device may first determine whether an absolute value of a difference between measurement results of the TX beam category 1 and the TX beam category 2 is less than the second threshold.

Similarly, the step of initializing the four TX beams into four TX beam categories is an optional step. In some embodiments, the terminal device may not perform this step, and may directly determine whether an absolute value of a difference between measurement results of any two TX beams is less than the second threshold.

For example, the beam historical information is an RSRP. If an absolute value of a difference between RSRPs obtained by measuring the TX beam category 1 and the TX beam category 2 by the terminal device is less than the second threshold, the terminal device may combine the TX beam category 1 and the TX beam category 2 into one category, where the category may be referred to as a TX beam category 1-2; and then, may determine whether an absolute value of a difference between RSRPs obtained by measuring the TX beam category 1-2 and the TX beam category 3 is less than the second threshold.

It should be noted that, because a measurement result of the TX beam category 1-2 includes RSRPs obtained by measuring the beam category 1 and the beam category 2 at different moments, an average value of the two beam categories may be first calculated, and then, whether an absolute value of a difference between RSRPs obtained by measuring a beam category based on the average value and the TX beam category 3 is less than the second threshold is determined.

The average value may be an arithmetic average value, a geometric average value, a root mean square average value, a weighted average value, or the like. This is not limited.

If the absolute value of the difference between the RSRPs obtained by measuring the TX beam category 1 and the TX beam category 2 by the terminal device is greater than or equal to the second threshold, the terminal device may determine whether an absolute value of a difference between measurement results of the TX beam category 1 and the TX beam category 3 is less than the second threshold; or may determine whether an absolute value of a difference between measurement results of the TX beam category 1 and the TX beam category 4 is less than the second threshold; or may determine whether an absolute value of a difference between measurement results of the TX beam category 2 and the TX beam category 3 is less than the second threshold; or may determine whether an absolute value of a difference between measurement results of the TX beam category 2 and the TX beam category 4 is less than the second threshold. This is not limited.

In other words, when an absolute value of a difference between RSRPs obtained by measuring any two TX beam categories by the terminal device is less than the second threshold, the two TX beam categories may be referred to as a group of TX beam categories, and the terminal device may continue to determine whether an absolute value of a difference between RSRPs obtained by measuring another TX beam category and the group of TX beam categories is less than the second threshold; or when an absolute value of a difference between RSRPs obtained by measuring any two TX beam categories by the terminal device is greater than or equal to the second threshold, the terminal device may determine whether an absolute value of a difference between RSRPs obtained by measuring another TX beam category and one of the two TX beam categories is less than the second threshold.

For example, it is assumed that for the TX beam category 1 and the TX beam category 2, RSRPs obtained by measuring the two TX beam categories by the terminal device are respectively:

$$\vec{b}_1 = (b_{1,1}, b_{1,2}, \ldots, b_{1,T}) = (65, 43, 52, 82, 60); \text{ and}$$

$$\vec{b}_2 = (b_{2,1}, b_{2,2}, \ldots, b_{2,T}) = (40, 50, 68, 58, 76).$$

Therefore, a difference between the two TX beam categories may be understood as a difference between the two TX beam categories in terms of any corresponding element, or may be understood as a difference between the two TX beam categories in terms of all corresponding elements; or may be understood as a difference between the two TX beam categories in terms of some corresponding elements. This is not limited.

For example, the difference between the two TX beam categories is the difference between the two TX beam categories in terms of any corresponding element. It is assumed that the second threshold in this application is 10. In this case, an absolute value of a difference between the TX beam category 1 and the TX beam category 2 in terms of a second element is 7, and is less than the second threshold 10. In this case, the TX beam category 1 and the TX beam category 2 may be combined into one category, and the one category is referred to as a TX beam category 1-2.

Then, a difference between RSRPs obtained by measuring the TX beam category 1-2 and the TX beam 3 may be calculated. Before this, an average value of the TX beam category 1-2 may be first calculated. An arithmetic average value is used as an example. An RSRP obtained by measuring the TX beam category 1-2 may be expressed as follows:

$$P\vec{b}_{1-2} = \frac{1}{N} \sum_{i=0}^{N} b_i = (52.5, 41.5, 60, 70, 68)$$

If an RSRP obtained by measuring the TX beam category 3 by the terminal device is $\vec{b}_3 = (b_{3,1}, b_{3,2}, \ldots, b_{3,T}) = (10, 15, 0, 1, 12)$, because an absolute value of a difference between the TX beam category 1-2 and the TX beam category 3 in terms of all elements is greater than the second threshold, it may be determined that the TX beam category 1-2 and the TX beam category 3 cannot be combined into one category.

The terminal device may continue to select any two TX beam categories, and determine whether the two TX beam categories can be combined into one category, and until no TX beam category cannot be combined, clustering is completed.

In conclusion, the terminal device may combine a plurality of TX beams by determining whether an absolute value of a difference between RSRPs obtained by measuring any two TX beam categories is less than the second threshold, to obtain the several TX beam categories in this embodiment of this application.

It should be understood that the first threshold and/or the second threshold in this embodiment of this application may be a fixed value, or may be a dynamically adjusted value. This is not specifically limited in this application.

It should be further understood that the first threshold and/or the second threshold in this embodiment of this application may be a value specified based on a protocol, or may be a value sent by the network device to the terminal device by using a message. This is not limited.

Figure 5:
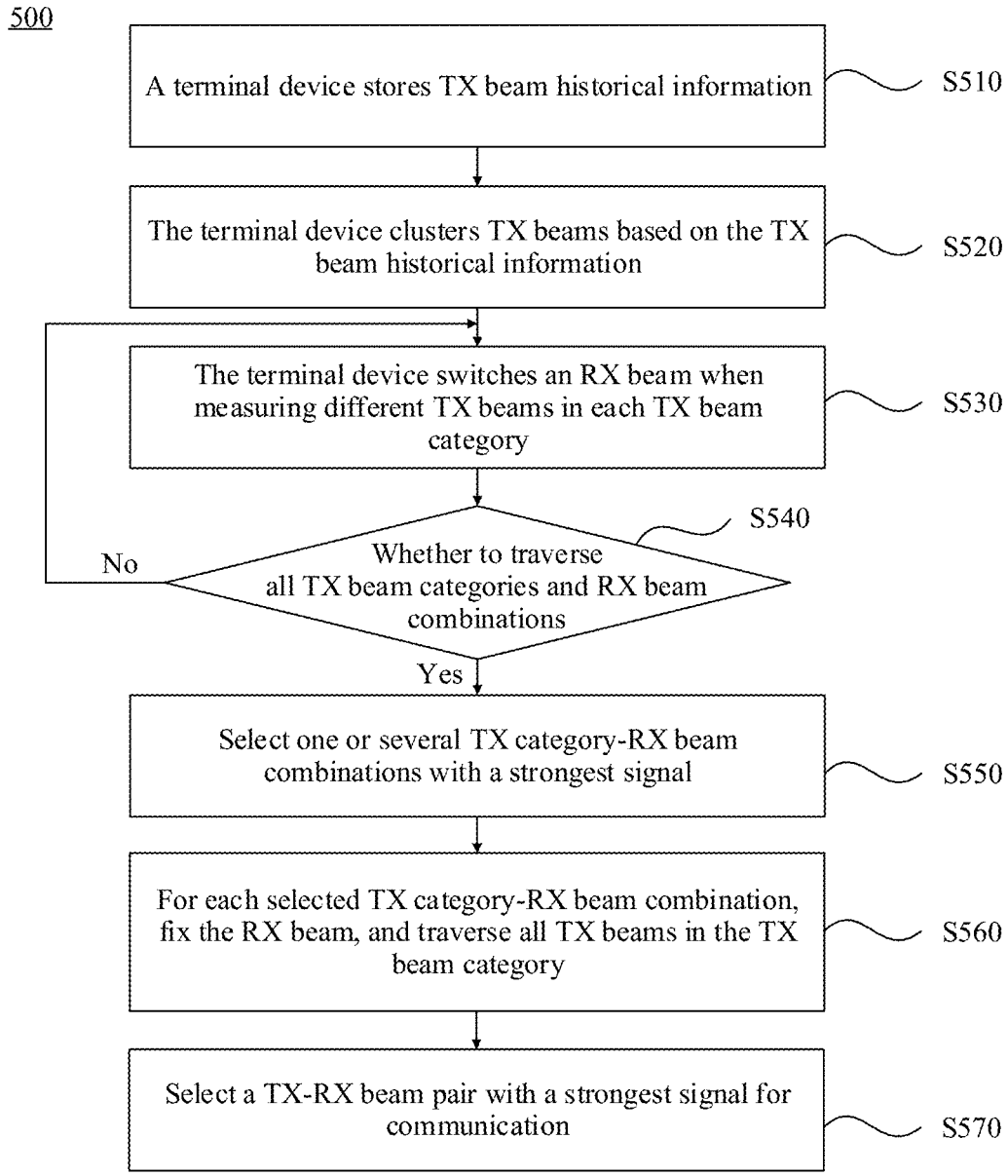
FIG. 5 is a schematic flowchart of a measurement method according to an embodiment of this application.

FIG. 5 is a schematic flowchart of a measurement method 500 according to an embodiment of this application. The method 500 may include steps S510 to S570.

S510: A terminal device stores TX beam historical information.

S520: The terminal device clusters TX beams based on the TX beam historical information.

S530: The terminal device switches an RX beam when measuring different TX beams in each TX beam category.

S540: Determine whether to traverse all TX beam categories and RX beam combinations.

Step S550 is performed if all the TX beam categories and RX beam combinations are traversed, and step S530 is performed if all the TX beam categories and RX beam combinations are not traversed.

S550: Select one or several TX category-RX beam combinations with a strongest signal.

S560: For each selected TX category-RX beam combination, fix the RX beam, and traverse all TX beams in the TX beam category.

S570: Select a TX-RX beam pair with a strongest signal for communication.

For detailed descriptions of steps S510 to S570, refer to the foregoing content. For brevity, details are not described herein again.

Figure 6A:
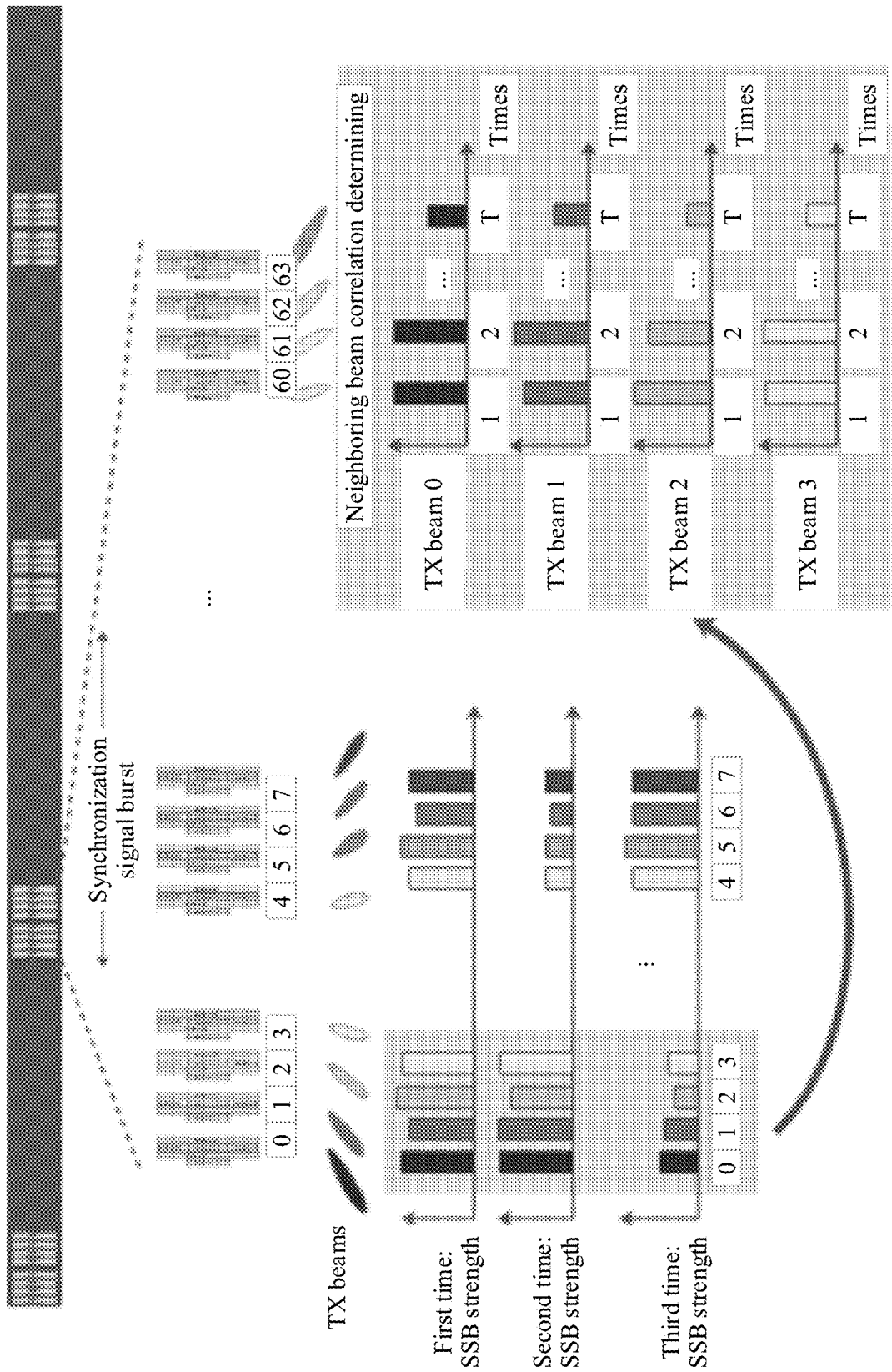
FIG. 6(a) to FIG. 6(c) is a schematic diagram of a measurement method according to an embodiment of this application.
Figure 6B:
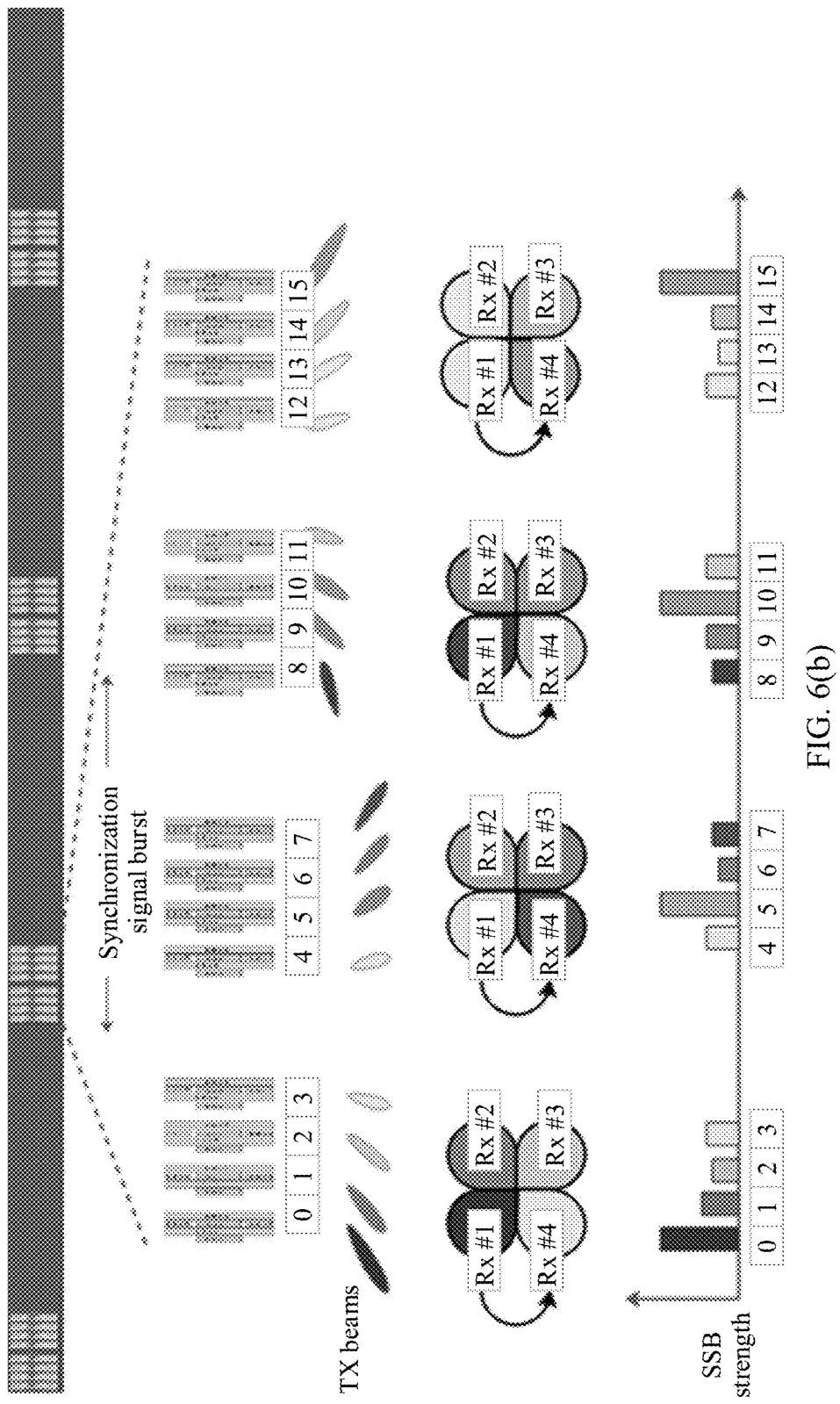
Figure 6C:
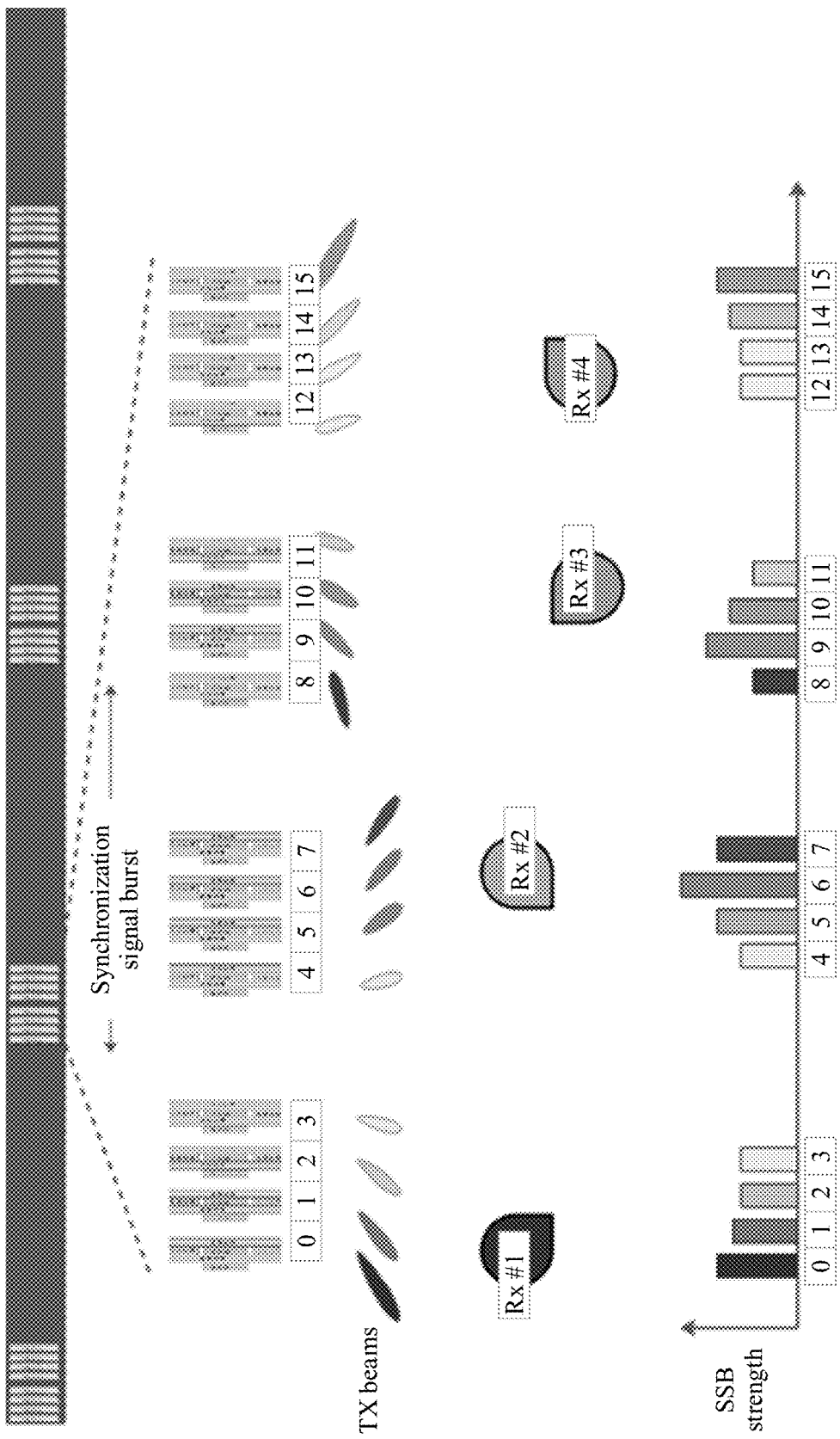

To help understand the solutions of this application, the following provides descriptions with reference to FIG. 6(a) to FIG. 6(c). FIG. 6(a) to FIG. 6(c) is a schematic diagram of a measurement method according to an embodiment of this application.

FIG. 6(a) is a schematic diagram of clustering a TX beam according to an embodiment of this application, FIG. 6(b) is a schematic diagram of selecting a target TX category-RX beam according to an embodiment of this application, and FIG. 6(c) is a schematic diagram of selecting a target TX-RX beam pair according to an embodiment of this application.

Phase 1:

Refer to FIG. 6(a). One SS burst may include 64 TX beams, which are respectively TX beams 0 to 63. The terminal device may cluster the 64 TX beams based on 64 pieces of TX beam historical information. A clustering method may be clustering the 64 TX beams by using a preset condition.

It can be learned from FIG. 6(a) that a final clustering result of the terminal device is as follows: TX beams 0 to 3 are clustered into one category (which may be referred to as a first TX beam category), TX beams 4 to 7 are clustered into one category (which may be referred to as a second TX beam category), . . . , and TX beams 60 to 63 are clustered into one category (which may be referred to as a $16^{th}$ TX beam category).

It can be learned from a rightmost graph in FIG. 6(a) that, for TX beams 0 to 3, strengths of the four TX beams tend to change with time in a same trend. Therefore, measurement results of the four TX beams may be mutually represented within a specific error range.

Phase 2:

Refer to FIG. 6(b). The terminal device may switch an RX beam based on a clustered TX beam category, and select the target TX category-RX beam through traversal.

The first TX beam category (including the TX beams 0 to 3) is used as an example. Because the four TX beams may represent each other, the terminal device may switch RX in a measurement process of the first TX beam category. In other words, the TX beam 0 may correspond to an RX beam 1, the TX beam 1 may correspond to an RX beam 2, the TX beam 2 may correspond to an RX beam 3, the TX beam 3 may correspond to an RX beam 4, and a strongest TX-RX beam in the first TX beam category is selected.

In other words, when measuring the TX beam 0, the terminal device may perform measurement by using an RX 1 beam; when measuring the TX beam 1, the terminal device may perform measurement by using an RX 2 beam; when measuring the TX beam 2, the terminal device may perform measurement by using an RX 3 beam; and when measuring the TX beam 3, the terminal device may perform measurement by using an RX 4 beam, to select the strongest TX-RX beam in the first TX beam category.

Similarly, for another TX beam category, selection may be performed in a same manner.

Therefore, a strongest TX-RX beam may be selected from each TX beam category, to form a target TX category-RX beam combination in this embodiment of this application.

For brevity, in this embodiment of this application, the first TX beam category, the second TX beam category, a third TX beam category, and a fourth TX beam category are used as examples. Refer to FIG. 6(b). It can be learned that the target TX category-RX beam combination determined by the terminal device includes a TX 0-RX 1 beam, a TX 5-RX 2 beam, a TX 10-RX 3 beam, and a TX 15-RX 4 beam.

It should be noted that, RX #1, RX #2, RX #3, and RX #4 shown in FIG. 6(b) are the RX 1 beam, the RX 2 beam, the RX 3 beam, and the RX 4 beam in this embodiment of this application.

Phase 3:

Refer to FIG. 6(c). The terminal device may determine the target TX-RX beam pair based on the target TX category-RX beam.

The first TX beam category (including the TX beams 0 to 3) is used as an example. The target TX category-RX beam combination determined in Phase 2 includes the TX 0-RX 1 beam. In this phase, the RX 1 beam may be fixed, and all TX beams in the first TX beam category are respectively measured. In other words, the terminal device may separately measure the TX 0-RX 1 beam, the TX 1-RX 1 beam, the TX 2-RX 1 beam, and the TX 3-RX 1 beam.

Similarly, for another TX beam category, measurement may be performed in a same manner.

After measurement performed by the terminal device on all TX beams in each TX beam category is completed, the terminal device may select a TX-RX beam pair with a strongest signal from the TX beam category.

Refer to FIG. 6(c). It can be learned that the target TX-RX beam pair finally determined by the terminal device is a TX 5-RX 2 beam pair.

In the solution provided in this embodiment of this application, because measurement results of TX beams (for example, the TX beams 0 to 3) sent by the network device are correlated to an extent, the terminal device may cluster the TX beams. In the measurement process, the terminal device may switch the RX beam based on the TX beam clustering result (for example, the TX beam 0 corresponds to the RX beam 1, the TX beam 1 corresponds to the RX beam 2, the TX beam 2 corresponds to the RX beam 3, the TX beam 3 corresponds to the RX beam 4), to narrow a search range of the target TX-RX beam pair, avoid a case in which the terminal device traverses all TX-RX beam pairs to perform measurement, and implement energy saving and a speed increase of measurement.

Specifically, it is assumed that one synchronization signal burst includes 16 TX beams, and four RX beams are included on a terminal device side. In the solution in the conventional technology, the terminal device may first fix one RX beam, and traverse and measure all TX beams, until all TX-RX beam combinations are traversed. In other words, the TX-RX beam pair with the strongest signal can be found only by performing measurement for 64 times.

However, in the solution of this application, the terminal device may first cluster the 16 TX beams in Phase 1, switch the RX beam based on a clustering result to select a target TX category-RX beam through traversal, and finally determine the target TX-RX beam pair based on the target TX category-RX beam.

That one synchronization signal burst includes 16 TX beams and four RX beams are included on the terminal device side is still used as an example. It is assumed that in Phase 1, the terminal device may cluster the 16 TX beams into four groups of TX beam categories. In Phase 2, the terminal device may switch the RX beam for each TX beam category to select the target TX category-RX beam through traversal (for example, for the first TX beam category (including the TX beams 0 to 3), the TX beam 0 may correspond to the RX beam 1, the TX beam 1 may correspond to the RX beam 2, the TX beam 2 may correspond to the RX beam 3, and the TX beam 3 may correspond to the RX beam 4). In this way, the terminal device may perform measurement for 16 times in Phase 2. In Phase 3, the terminal device may determine the target TX-RX beam pair based on the target TX category-RX beam (for example, for the first TX beam category, the target TX category-RX beam combination determined in Phase 2 includes a TX 0-RX 1 beam, and in the phase, the RX 1 beam may be fixed, and all TX beams in the first TX beam category are separately measured). In this way, the terminal device may determine the target TX-RX beam pair by performing measurement for 16 times in Phase 3.

Therefore, in the solution in this embodiment of this application, the target TX-RX beam pair can be determined by performing measurement for 32 times. Compared with the conventional technology in which the target TX-RX beam pair can be determined only by performing measurement for 64 times, energy saving and a speed increase of measurement can be implemented.

It should be noted that, in the example shown in FIG. 6(a) to FIG. 6(c), a quantity of TX beams included in each TX beam category is the same as a quantity of RX beams. In some embodiments, a quantity of TX beams included in one TX beam category may be different from a quantity of RX beams. In this case, the target TX-RX beam pair may be found in the following manner.

It is assumed that the terminal device clusters at least two TX beams based on TX beam historical information of the at least two TX beams, to obtain several TX beam categories, and a quantity of TX beams in a TX beam category in the several TX beam categories is different from a quantity of RX beams. For example, there are four RX beams (for example, RX beams 0 to 4), a TX beam category 1 includes three TX beams (for example, TX beams 0 to 2), a TX beam category 2 includes five TX beams (for example, TX beams 3 to 7), a TX beam category 1 includes three TX beams (for example, TX beams 8 to 10), and a TX beam category 4 includes five TX beams (for example, TX beams 11 to 15).

In a process in which the terminal device measures the TX beam category 1 and the TX beam category 2, the terminal device may measure the TX beam category 1 and the TX beam category 2 by using a plurality of SS bursts generated by the network device. Usually, results obtained after the terminal device clusters different SS bursts generated by a same network device are similar. For example, results obtained after the terminal device performs clustering by using the SS burst 1 and the SS burst 2 each may be that the TX beam category 1 includes three TX beams (for example, the TX beams 0 to 2), the TX beam category 2 includes five TX beams (for example, the TX beams 3 to 7), and the TX beam category 1 include three TX beams (for example, the TX beams 8 to 10), and the TX beam category 4 includes five TX beams (for example, the TX beams 11 to 15).

For the TX beam category 1 (for example, the TX beams 0 to 2) in the SS burst 1, the terminal device may switch the RX beam in the measurement process. For example, the TX beam 0 corresponds to the RX beam 1, the TX beam 1 corresponds to the RX beam 2, and the TX beam 2 corresponds to the RX beam 3.

For the TX beam category 1 (for example, the TX beams 0 to 2) in the SS burst 2, the terminal device may perform measurement by using the RX 4 beam in the measurement process. In other words, the TX beams 0 to 2 may all correspond to the RX 4 beam.

The terminal device may determine a strongest TX-RX beam in the TX beam category 1 based on measurement results of the two SS bursts.

Similarly, the TX beam category 2, the TX beam category 3, and the TX beam category 4 may be measured in a method similar to the foregoing method, and a strongest TX-RX beam in each TX beam category is determined, to form the target TX category-RX beam combination in this embodiment of this application.

Finally, the terminal device may determine the target TX-RX beam pair based on the target TX category-RX beam combination and the RX beam.

Because the terminal device may cluster the TX beam, in the measurement process, the RX beam may be switched based on the TX beam clustering result, to narrow a search range of the target TX-RX beam pair. Compared with the solution in the conventional technology in which the terminal device needs to traverse all TX-RX beam pairs to perform measurement, in the solution in this embodiment of this application, a case in which the terminal device traversals all the TX-RX beam pairs to perform measurement can be avoided, to implement energy saving and a speed increase of measurement.

Optionally, in some embodiments, that the terminal device clusters at least two TX beams based on TX beam historical information of the at least two TX beams includes: The terminal device clusters the at least two TX beams based on the TX beam historical information of the at least two TX beams in response to indication information received by the terminal device, where the indication information is used to indicate the terminal device to perform optimized beam measurement.

In this embodiment of this application, after receiving the indication information of the network device, the terminal device may start to perform optimized beam measurement, in other words, may start to cluster the at least two TX beams based on the TX beam historical information of the at least two TX beams.

It should be understood that, in some implementations, when the terminal device does not receive the indication information sent by the network device, the terminal device may also start to perform optimized beam measurement. For example, if the terminal device detects that a current signal is weak, the terminal device may start to perform optimized beam measurement, to switch to a beam with a strong signal.

The foregoing describes in detail the measurement method provided in embodiments of this application with reference to FIG. 1 to FIG. 6(c). The following describes a device side in embodiments of this application with reference to FIG. 7 and FIG. 8.

Figure 7:
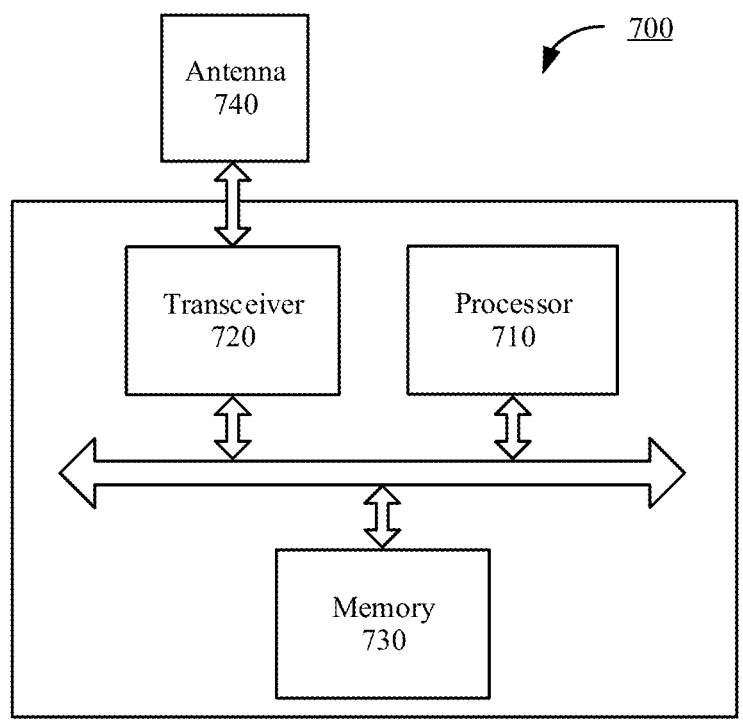
FIG. 7 is a schematic block diagram of a terminal device according to an embodiment of this application.

FIG. 7 is a schematic diagram of a structure of a terminal device according to an embodiment of this application. The terminal device 700 may include a processor 710.

The processor 710 is configured to:
cluster at least two transmission TX beams based on TX beam historical information of the at least two TX beams, to obtain several TX beam categories; and
determine a target TX-RX beam pair based on the several TX beam categories and at least one receiving RX beam.

Optionally, in some embodiments, the processor 710 is further configured to: determine a target TX category-RX beam combination based on the several TX beam categories and the at least one RX beam; and determine the target TX-RX beam pair based on the target TX category-RX beam combination.

Optionally, in some embodiments, the processor 710 is further configured to combine the at least two TX beams into one category if the TX beam historical information of the at least two TX beams meets a preset condition.

Optionally, in some embodiments, the preset condition is at least one of the following conditions: an included angle cosine of the TX beam historical information of the at least two TX categories is greater than a first threshold, the TX beam historical information of the at least two TX beams changes with time in a same trend, and a difference between measurement results of the at least two TX beams by the terminal device is less than a second threshold.

Optionally, in some embodiments, the TX beam historical information/RX beam historical information includes at least one piece of the following information: SNRs of the TX beam/RX beam at different moments, SINRs of the TX beam/RX beam at different moments, RSRPs of the TX beam/RX beam at different moments, and reference signal received quality RSRQ of the TX beam/RX beam at different moments.

Optionally, in some embodiments, the processor 710 is further configured to cluster the at least two TX beams based on the TX beam historical information of the at least two TX beams in response to indication information received by the terminal device, where the indication information is used to indicate the terminal device to perform optimized beam measurement.

Optionally, in some embodiments, the terminal device 700 may further include a transceiver 720 and a memory 730. The processor 710, the transceiver 720, and the memory 730 communicate with each other through an internal connection path, to transfer a control signal and/or a data signal. The memory 730 is configured to store a computer program, and the processor 710 is configured to invoke and run the computer program from the memory 730, to control the transceiver 720 to send or receive a signal.

The processor 710 and the memory 730 may be combined into one processing apparatus. The processor 710 is configured to execute program code stored in the memory 730, to implement a function of the terminal device in the method embodiments. In a specific implementation, the memory 730 may alternatively be integrated into the processor 710, or may be independent of the processor 710. The transceiver 720 may be implemented by using a transceiver circuit.

The terminal device 700 may further include an antenna 740, configured to: send, by using a radio signal, downlink data or downlink control signaling output by the transceiver 720; or receive uplink data or uplink control signaling, and send the uplink data or uplink control signaling to the transceiver 720 for further processing.

Figure 8:
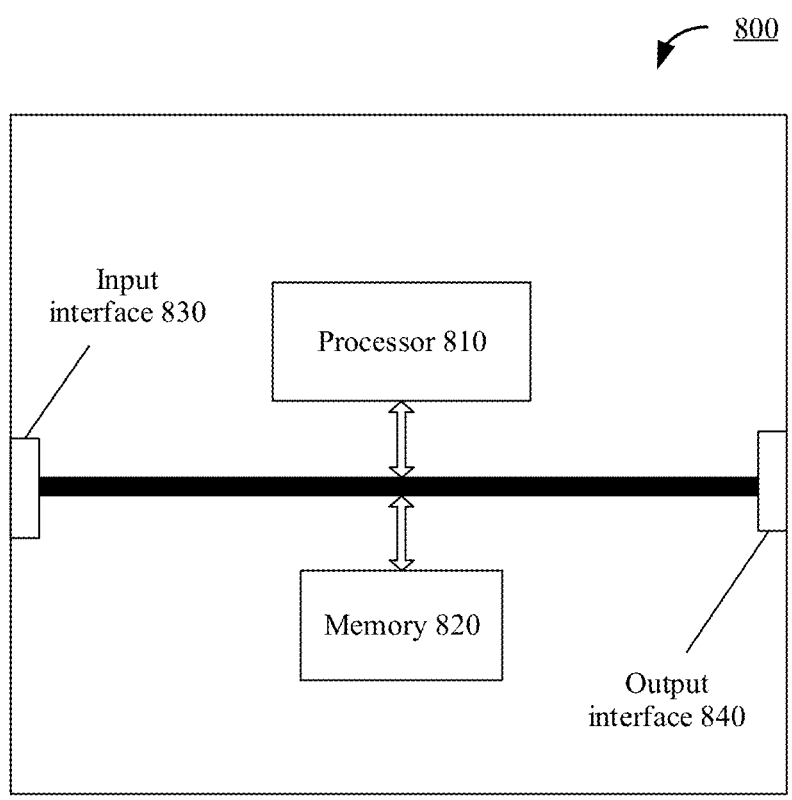
FIG. 8 is a schematic block diagram of a chip according to an embodiment of this application.

FIG. 8 is a schematic diagram of a structure of a chip according to an embodiment of this application. A chip 800 shown in FIG. 8 includes a processor 810. The processor 810 may invoke and run a computer program from a memory, to implement the method in embodiments of this application.

Optionally, as shown in FIG. 8, the chip 800 may further include a memory 820. The processor 810 may invoke and run a computer program from the memory 820, to perform steps in the method 300 to the method 500 in embodiments of this application.

The memory 820 may be an independent component independent of the processor 810, or may be integrated into the processor 810.

Optionally, the chip 800 may further include an input interface 830. The processor 810 may control the input interface 830 to communicate with another device or chip. Specifically, the processor 810 may obtain information or data sent by the another device or chip.

Optionally, the chip 800 may further include an output interface 840. The processor 810 may control the output interface 840 to communicate with another device or chip. Specifically, the processor 810 may output information or data to the another device or chip.

Optionally, the chip may be applied to a terminal device in embodiments of this application, and the chip may implement a corresponding procedure implemented by the terminal device in each method in embodiments of this application. For brevity, details are not described herein again.

It should be understood that the chip mentioned in this embodiment of this application may also be referred to as a system-level chip, a system chip, a chip system, a system on chip, or the like.

An embodiment of this application further provides a computer-readable storage medium, configured to store a computer program.

Optionally, the computer-readable storage medium may be applied to a terminal device in embodiments of this application, and the computer program enables a computer to execute a corresponding procedure implemented by the terminal device in each method in embodiments of this application. For brevity, details are not described herein again.

An embodiment of this application further provides a computer program product, including computer program instructions.

Optionally, the computer program product may be applied to a terminal device in embodiments of this application, and the computer program instructions enable a computer to execute a corresponding procedure implemented by the terminal device in each method in embodiments of this application. For brevity, details are not described herein again.

Embodiments of this application further provide a computer program.

Optionally, the computer program may be applied to a terminal device in embodiments of this application. When the computer program runs on a computer, the computer is enabled to perform a corresponding procedure implemented by the terminal device in each method in embodiments of this application. For brevity, details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In several embodiments provided in this application, it should be understood that the disclosed system, apparatus, and method may be implemented in another manner. For example, the described apparatus embodiments are merely examples. For example, division into the modules is merely logical function division and may be other division in an actual implementation. For example, a plurality of modules or components may be combined or integrated into another system. In addition, the displayed or discussed mutual coupling or communication connection may be indirect coupling or a communication connection performed through some interfaces, apparatuses, or units.

In addition, functional units in embodiments of this application may be integrated into one physical entity, or each unit may independently correspond to one physical entity, or two or more units may be integrated into one physical entity.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A measurement method, applied to a terminal device, comprising:
   clustering, by the terminal device, at least two transmission (TX) beams based on TX beam historical information of the at least two TX beams, to obtain several TX beam categories; and
   determining, by the terminal device, a target TX-RX beam pair based on the several TX beam categories and at least one receiving RX beam, wherein the target TX-RX beam pair comprises:
      determining, by the terminal device, a target TX category-RX beam combination based on the several TX beam categories and the at least one RX beam; and
      determining, by the terminal device, the target TX-RX beam pair based on the target TX category-RX beam combination.

2. The method according to claim 1, wherein the clustering, by the terminal device, the at least two transmission TX beams based on the TX beam historical information of the at least two TX beams comprises:
   combining, by the terminal device, the at least two TX beams into one category in response to the TX beam historical information of the at least two TX beams meeting a preset condition.

3. The method according to claim 2, wherein the preset condition is at least one of the following conditions:
   an included angle cosine of the TX beam historical information of the at least two TX beams is greater than a first threshold,
   the TX beam historical information of the at least two TX beams changes with time in a same trend, and
   an absolute value of a difference between measurement results of the at least two TX beams by the terminal device is less than a second threshold.

4. The method according to claim 1, wherein the TX beam historical information/RX beam historical information comprises at least one piece of the following information:
   signal-to-noise ratios (SNRs) of the TX beam/RX beam at different moments,
   signal to interference plus noise ratios (SINRs) of the TX beam/RX beam at different moments,
   reference signal received powers (RSRPs) of the TX beam/RX beam at different moments, and
   reference signal received quality (RSRQ) of the TX beam/RX beam at different moments.

5. The method according to claim 1, wherein the clustering, by the terminal device, the at least two transmission TX beams based on TX beam historical information of the at least two TX beams comprises:
   clustering, by the terminal device, the at least two TX beams based on the TX beam historical information of the at least two TX beams in response to indication information received by the terminal device, wherein the indication information indicates the terminal device to perform optimized beam measurement.

6. A terminal device comprising:
   a memory coupled to a processor and having processor executable instructions stored thereon, and
   the processor, upon executing the instructions, is configured to:
   cluster at least two transmission (TX) beams based on TX beam historical information of the at least two TX beams, to obtain several TX beam categories; and
   determine a target TX-RX beam pair based on the several TX beam categories and at least one receiving RX beam, wherein the target TX-RX beam pair comprises:
      determining, by the terminal device, a target TX category-RX beam combination based on the several TX beam categories and the at least one RX beam; and
      determining, by the terminal device, the target TX-RX beam pair based on the target TX category-RX beam combination.

7. The terminal device according to claim 6, wherein the processor is further configured to:
   combine the at least two TX beams into one category in response to the TX beam historical information of the at least two TX beams meeting a preset condition.

8. The terminal device according to claim 7, wherein the preset condition is at least one of the following conditions:
   an included angle cosine of the TX beam historical information of the at least two TX categories is greater than a first threshold,
   the TX beam historical information of the at least two TX beams changes with time in a same trend, and
   an absolute value of a difference between measurement results of the at least two TX beams by the terminal device is less than a second threshold.

9. The terminal device according to claim 6, wherein the TX beam historical information/the RX beam historical information comprises at least one piece of the following information:
   signal-to-noise ratios (SNRs) of the TX beam/RX beam at different moments,
   signal to interference plus noise ratios (SINRs) of the TX beam/RX beam at different moments,
   reference signal received powers (RSRPs) of the TX beam/RX beam at different moments, and
   reference signal received quality (RSRQ) of the TX beam/RX beam at different moments.

10. The terminal device according to claim 6, wherein the processor is further configured to:
    cluster the at least two TX beams based on the TX beam historical information of the at least two TX beams in response to indication information received by the terminal device, wherein the indication information indicates the terminal device to perform optimized beam measurement.

11. A chip system comprising:
    a memory, configured to store instructions; and
    a processor, configured to execute the instructions stored in the memory, to enable a communications device on which the chip system is installed to:
    cluster at least two transmission (TX) beams based on TX beam historical information of the at least two TX beams, to obtain several TX beam categories; and
    determine a target TX-RX beam pair based on the several TX beam categories and at least one receiving RX beam, wherein the target TX-RX beam pair comprises:

determining, by the terminal device, a target TX category-RX beam combination based on the several TX beam categories and the at least one RX beam; and determining, by the terminal device, the target TX-RX beam pair based on the target TX category-RX beam combination.

12. The chip system according to claim 11, wherein the processor is further configured to:

combine the at least two TX beams into one category in response to the TX beam historical information of the at least two TX beams meeting a preset condition.

13. The chip system according to claim 12, wherein the preset condition is at least one of the following conditions:

an included angle cosine of the TX beam historical information of the at least two TX categories is greater than a first threshold, the TX beam historical information of the at least two TX beams changes with time in a same trend, and an absolute value of a difference between measurement results of the at least two TX beams by the terminal device is less than a second threshold.

14. The chip system according to claim 11, wherein the TX beam historical information/the RX beam historical information comprises at least one piece of the following information:

signal-to-noise ratios (SNRs) of the TX beam/RX beam at different moments, signal to interference plus noise ratios (SINRs) of the TX beam/RX beam at different moments, reference signal received powers (RSRPs) of the TX beam/RX beam at different moments, and reference signal received quality (RSRQ) of the TX beam/RX beam at different moments.

15. The chip system according to claim 11, wherein the processor is further configured to:

cluster the at least two TX beams based on the TX beam historical information of the at least two TX beams in response to indication information received by the terminal device, wherein the indication information indicates the terminal device to perform optimized beam measurement.

* * * * *